(12) United States Patent
Kincaid

(10) Patent No.: US 8,340,389 B2
(45) Date of Patent: Dec. 25, 2012

(54) CELLULAR- OR SUB-CELLULAR-BASED VISUALIZATION INFORMATION USING VIRTUAL STAINS

(75) Inventor: Robert H. Kincaid, Half Moon Bay, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1064 days.

(21) Appl. No.: 12/324,600

(22) Filed: Nov. 26, 2008

(65) Prior Publication Data

US 2010/0128988 A1 May 27, 2010

(51) Int. Cl.
*G06K 9/00* (2006.01)
(52) U.S. Cl. ...................................................... 382/133
(58) Field of Classification Search ........... 382/100–150
See application file for complete search history.

(56) References Cited

U.S. PATENT DOCUMENTS

2004/0027350 A1   2/2004   Kincaid

OTHER PUBLICATIONS

Ahlberg., "Spotfire: an Information Exploration Environment," SIGMOD Rec, vol. 25, No. 4, pp. 25-29, 1996.
Carpenter et al., "CellProfiler: image analysis software for identifying and quantifying cell phenotypes," Genome Biology, vol. 7, 11 pgs, 2006.
Comaniciu et al., "Cell Image Segmentation for Diagnostic Pathology," pp. 1-30, 2002.
George TC et al., "Measurement of nuclear translocation in primary T cells using correlation analysis of images obtained on the ImageStream system," www.amnis.com 800.730.7147, 4 pgs., 2008.
Hendriks et al., "Three-dimensional morphology and gene expression in the *Drosophila blastoderm* at cellular resolution I: data acquisition pipeline," Genome Biology, vol. 7, 21 pgs, 2006.
Kachouie et al., "Watershed Deconvolution for Cell Segmentation," Engineering in Medicine and Biology Society, 2008, EMBS,2008. 30th Annual International Conference of the IEEE; pp. 375-378, Nov. 11, 2008.
Kincaid., VistaClara: "An Interactive Visualization for Exploratory Analysis of DNA Microarrays," presented at Proceeding of the 2004 ACM symposium on Applied computing, Nicosia, Cyprus, pp. 167-174, 2004.
Meas-Yedid et al., "Quantitative microscopic image analysis by Active Contours," Vision Interface Annual Conference, 8 pgs., 2001.
Rao et al., "The Table Lens: Merging Graphical and Symbolic Representations in an Interactive Focus+Context Visualization for Tabular Information," Proceedings of the SIGCHI conference on Human factors in computin Systems: celebrating interdependence; Boston, Mass, US: ACM, pp. 1-7, Apr. 1994.
Gunter et., "Visual Exploration of Three-dimensional Gene Expression Using Physical Views and Linked Abstract Views," IEEE/ACM Transactions on Computational Biology and Bioinformatics (in press), 2008 pp. 1-14, 2007.
Wollman et al., "High throughput microscopy: from raw images to discoveries," Journal of Cell Science, vol. 120, p. 3715-3722, 2007.

*Primary Examiner* — Dixomara Vargas

(57) ABSTRACT

Methods, systems and computer readable storage media for providing image-extracted measurements extracted from an image of at least one cell or subcellular component with the image. At least one attribute is determined from the image-extracted measurement of the at least one cell or sub-cellular component. The image of the at least one cell or sub-cellular component is virtually stained with at least one color, wherein different colors represent different attributes, and wherein the at least one color is virtually stained in locations of the image from where the image-extracted measurements were extracted for the attribute that that color represents.

27 Claims, 14 Drawing Sheets
(12 of 14 Drawing Sheet(s) Filed in Color)

CELLULAR- OR SUB-CELLULAR-BASED VISUALIZATION INFORMATION USING VIRTUAL STAINS

BACKGROUND OF THE INVENTION

It is currently a common practice to quantitate per-cell properties from microscope images, e.g., see Wollman et al., "High throughput microscopy: from raw images to discoveries," *Journal of Cell Science*, vol. 120, pp. 3715-3722, 2007. One simple example of such quantitation involves simply counting cells that have a particular property that a researcher is interested in.

More sophisticated techniques may employ image processing techniques to computationally determine cell boundaries and measuring attributes of cells defined by the cell boundaries. These attributes can be derived from measuring the intensity of fluorescent stains, or they may be entirely derived from direct image processing using tools and techniques such as edge detection algorithms and pixel statistics.

Traditionally, attributes processing has involved making an image (or collection of related images) of cells from which quantitative information characterizing the cells is then derived. The quantitative information data is then processed by various means of multivariate data analysis to examine the distribution of the attributes quantitated by the quantitative information data among the cells, or to determine characteristic attributes of specific cell phenotypes. For example, there may be something characteristic about the shape of cancer cells that distinguish them from normal tissue cells and the techniques described above may be used to attempt to quantitate the number of cells having shapes characteristic of cancer cells, versus cells that do not have the characteristic shape, which would be considered normal or non-cancerous.

Carpenter et al., "CellProfiler: image analysis software for identifying and quantifying cell phenotypes", *Genome Biology*, vol. 7, 2006, describes software referred to as "CellProfiler" that can be used to compute the number of nearest neighbors that each cell in an image has. The software uses image processing techniques to identify cells in an image of cells, and computes nearest neighbor counts for each cell. A monochrome gradient shown in a representation of the image of the cells represents graphically the nearest neighbor count for each cell; and the overall size and relative locations of the cells is recognized. However, the user cannot directly compare the extracted cell boundaries determined by CellProfiler and displayed in the image showing the monochrome gradient with the original cell image. This makes it difficult to determine the accuracy of the cell segmentation that was performed by CellProfiler. Furthermore, the monochrome gradient image is a static, non-interactive display. If the user sees a particular cell of interest, the user must manually determine where that cell is located in corresponding images. Still further, there is no connection between the cell of interest in an image with the extracted numerical data. Thus, if the user desires to determine the exact value of an attribute being rendered in a cell, the user would have to manually try to find the corresponding cell in a table of numbers. However, there would be nothing to use for such correlation, other than pixel location in the image, and therefore finding the corresponding cell in the table would be extremely tedious.

Gunther et al., "Visual Exploration of Three-dimensional Gene Expression Using Physical Views and Linked Abstract Views", *IEEE/ACM Transactions on Computational Biology and Bioinformatics* (*in press*), 2008; and Hendriks et al., "Three-dimensional morphology and gene expression in the *Drosophila* blastoderm at cellular resolution I: data acquisition pipeline", *Genome Biology*, vol. 7, 2006, describes a system that was used to analyze the development of fruit fly embryos. Embryos were labeled with two fluorophores to detect two gene products and with a third fluorophore to detect the nuclei of the cells. The embryos were then imaged using a confocal microscope and images were processed to detect all blastoderm nuclei and measure the fluorescent intensities of each gene product in the nucleus and in the apical and basal parts of the nearby cytoplasm. After image processing, the cells are imaged as spheres or polygons to form idealized representations of the cells. In this way a three-dimensional image is formed representing every cell in the entire developing embryo. However, the "cell boundaries" in this image are an artificial construction and do not represent the true cell boundaries in the original image. Further, this system does not provide cell measurements, attributes of cells or any other data characterizing cells on the original source image of the cells.

It would be desirable to provide a solution in which a user can analyze quantitative information data in the context of the image or images from which the quantitative information data was derived.

SUMMARY OF THE INVENTION

The present invention provides methods, user interfaces, systems and computer readable storage media for providing image-extracted measurements extracted from an image of at least one cell or sub-cellular component with the image.

In at least one embodiment, a method is provided, comprising: determining at least one attribute from the image-extracted measurement of the at least one of the cell or sub-cellular component; and virtually staining the image of the at least one cell or sub-cellular component with at least one color, wherein different colors represent different attributes, and wherein the at least one color is virtually stained in locations of the image from where the image-extracted measurements were extracted for the attribute that that color represents.

In at least one embodiment, each color is mapped via color gradient mapping to a range of values.

In at least one embodiment, each color is virtually stained in intensities that are representative of the attribute values at the locations that the colors are stained in.

In at least one embodiment, the method includes determining a boundary of the at least one cell or sub-cellular component, and displaying the boundary on the image.

In at least one embodiment, the image comprises a cell and the determining a boundary comprises determining a cell boundary of the at least one cell.

In at least one embodiment, the method includes displaying at least one of a table of values of the at least one attribute and a statistical plot showing relationships of the at least one attribute adjacent the display of the virtually stained image.

In at least one embodiment, the virtually stained image and the at least one, of a table of values and a statistical plot, are linked to provide interactive function on all displays by user selection on one of the displays.

In at least one embodiment, the image is an image produced by an instrument in real time.

In at least one embodiment, the image is an image produced by a microscope.

In at least one embodiment, the image is displayed from an electronic file.

In at least one embodiment, the image comprises cells, the method further comprising: selecting, by a user, one of the cells in the image; and in response to the selecting, automatically displaying attributes data for the selected cell in the table.

In at least one embodiment, the method further comprises: selecting, by a user, one of the cells in the image; and selecting, by a user, a feature for finding all other cells in the image having similar attributes, wherein upon the selecting a feature, all other cells in the image having similar attributes to the selected cell are identified.

In at least one embodiment, the method further comprises: selecting, by a user, one of the cells in the image or the table; and selecting, by a user, a feature for finding all other cells in the image having similar attributes, wherein upon the selecting a feature, all other cells in the image having similar attributes to the selected cell are identified in at least one of the image and the table.

In at least one embodiment, the method includes adjusting the virtual staining of the image to emphasize one of: the stained attributes, and features of the image that existed prior to the virtual staining.

In at least one embodiment, the adjusting comprises varying the transparency/opacity of the virtual staining.

In at least one embodiment, the adjusting comprises flickering the display of the virtual staining by cyclically fading the display between a visualization of the virtual staining in fully transparent mode and fully opaque mode.

In at least one embodiment, the method includes dynamically filtering the values in the table.

In at least one embodiment, the method includes computationally analyzing the values in the table and displaying results thereof in the statistical plot.

In at least one embodiment, the method includes adding user-created annotations to the table and displaying the user-created annotations.

In at least one embodiment, the method includes performing at least one statistical calculation using the user-created annotations to classify the attribute values.

In at least one embodiment, the image comprises an array of single cell images.

A user interface for providing image-extracted measurements extracted from an image of at least one cell or sub-cellular component with the image is provided, including: a display; a processor; and programming for determining at least one attribute from the image-extracted measurement of at least one of the cell or sub-cellular component; and virtually staining the image of the at least one cell or sub-cellular component with at least one color, wherein different colors represent different attributes, and wherein the at least one color is virtually stained in locations of the image from where the image-extracted measurements were extracted for the attribute that that color represents.

In at least one embodiment, the user interface includes a user selectable feature for each of the attributes displayed in a table, wherein selection of a feature for an attribute causes the user interface to virtually stain the image with virtual staining for the selected attribute.

In at least one embodiment, the user interface includes a user-selectable adjustment feature for adjusting a transparency/opacity level of the virtual staining.

In at least one embodiment, the user interface includes a user-selectable feature to initiate or end flickering the display of the virtual staining by cyclically fading the display between a visualization of the virtual staining in fully transparent mode and fully opaque mode.

A computer readable storage medium having stored thereon one or more sequences of instructions for comparing image-extracted measurements extracted from an image of at least one cell or sub-cellular component with the image is provided, wherein execution of the one or more sequences of instructions by one or more processors causes the one or more processors to perform a process comprising: determining at least one attribute from the image-extracted measurement of at least one of the cell or sub-cellular component; and virtually staining the image of the at least one cell or sub-cellular component with at least one color, wherein different colors represent different attributes, and wherein the at least one color is virtually stained in locations of the image from where the image-extracted measurements were extracted for the attribute that that color represents.

In at least one embodiment, the computer readable storage medium further includes one or more sequences of instructions for color mapping, wherein execution of the one or more sequences of instructions for color mapping by the one or more processors causes the one or more processors to color map each color via color gradient mapping to a range of values determined for the respective attribute, and wherein each color is virtually stained in colors that are representative of the attribute values at the locations that the colors are stained in.

In at least one embodiment, the computer readable storage medium includes one or more sequences of instructions for determining boundaries, wherein execution of the one or more sequences of instructions for determining boundaries by the one or more processors causes the one or more processors to determine boundaries of the at least one cell or sub-cellular component, and display the boundaries on the image.

In at least one embodiment, the computer readable storage medium includes one or more sequences of instructions for displaying, wherein execution of the one or more sequences of instructions for displaying by the one or more processors causes the one or more processors to display at least one of a table of values of the at least one attribute and a statistical plot showing relationships of the at least one attribute adjacent the display of the virtually stained image.

In at least one embodiment, the computer readable storage medium includes one or more sequences of instructions for linking, wherein execution of the one or more sequences of instructions for linking by the one or more processors causes the one or more processors to link the virtually displayed image and the at least one of a table of values and a statistical plot, to provide interactive function on all displays by user selection on one of the displays.

These and other features of the invention will become apparent to those persons skilled in the art upon reading the details of the invention as more fully described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
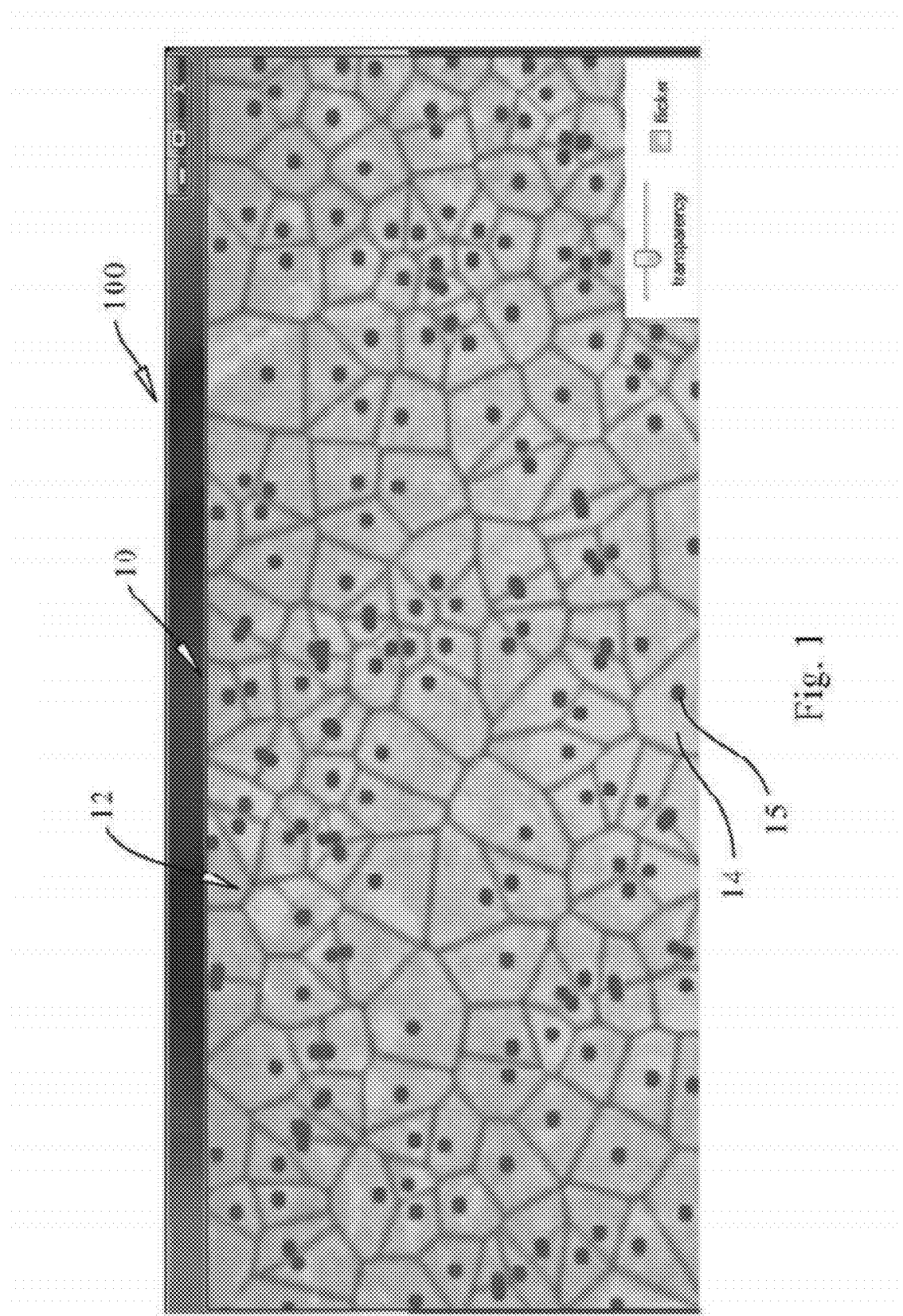
FIG. 1 schematically illustrates a user interface according to an embodiment of the present invention, displaying an image of cells.

Before the present systems, methods and computer readable storage media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a cell" includes a plurality of such cells and reference to "the image" includes reference to one or more images and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

An "attribute" is a specification that defines a property of an object, element, or file. An attribute of an object may be a name and/or a value; of an element, a type or class name; of a file, a name and extension. For example, in computer graphics, line objects can have attributes such as thickness (with real values), color (with descriptive values such as brown or green or values defined in a certain color model, such as RGB), dashing attributes, etc. A circle object can be defined in similar attributes plus an origin and radius. Markup languages, such as HTML and XML, use attributes to describe data and the formatting of data.

The term "alpha blending" refers to a convex combination of two colors allowing for transparency effects in computer graphics.

The terms "intensity" and "color intensity" as used herein, refer to color gradient. Therefore, the terms "intensity" and "color intensity" are used to refer to color gradient generically, but not to any specific method used to create the color gradient.

DETAILED DESCRIPTION

The present invention provides the user with the ability to display representations of image-extracted per-cell or per-cell component measurements directly with the original source image or images of the cells or cellular components from which the measurements were derived. As quantitative microscopy and high content screening become more important for use in the biological arts, the need for the types of comparisons facilitated by the present invention will become ever more important. Examples of applications of the present invention to the biological arts include, but are not limited to: high content screening, quantitative histopathology and laser microdissection.

In high content screening applications, large volumes of measurements on many biological samples are made. In this type of use, it is likely that not every single image would be viewed by a user, using the present invention. Rather, the processing would be similar to high throughput screening of microarrays. That is, even though the process would be highly automated, the need to inspect and analyze individual images still remains. This is particularly true when developing the high throughput protocol, because it is necessary to inspect representative test images to make sure that the computation process used is properly extracting accurate information. Inspection and analysis of individual images is also necessary for debugging problematic data that is observed from an actual study, where non-test images are processed. Still further, an actual study might reveal a new phenomenon not designed for the current protocol being run and where, in this case, re-inspection of some images may reveal a refinement to the computational methods that would enable a recalculation of image data, according to a revised protocol, to account for the new phenomenon.

Quantitative histopathology is a newly emerging field from classic histopathology. Following very similar image analysis methods to classic histopathology, image-based "biomarkers" are found that can help determine the pathology of clinical tissue samples. However, most current histopathologists still rely on their own personal judgments based on personally inspecting raw microscope images. The present invention provides a useful bridge between the fields of classic histopathology and quantitative histopathology in that the quantitative data can be viewed and explored in the context in which pathologists/histopathologists are most familiar, i.e., in the context of the original image taken or stored of the cell or cells. This can also improve the confidence of the histopathologist (user) in a computational result, since the user can readily check any image to see if the computation agrees with her/his own assessment of the image. However, the supplemental quantitative measurements provided by the present invention may provide a degree of precision not possible with merely "eye-balling" the image. Also the present invention facilitates more efficient development of rule-type systems that are created as part of the image processing protocol.

The present invention can also be used as a front-end user interface to a microdissection system. The present invention provides the ability to interactively select groups of cells based on image-derived or computationally-derived, per-cell properties. This greatly increases the efficiency in selecting cells, which is a necessary step prior to conducting microdissection, as such cell selection is currently done manually, and can be, and typically is, very tedious.

Turning now to FIG. 1, a display 10 of user interface 100 is schematically shown displaying an image 12 of cells in this instance. Although this description will refer to analysis of cells, as previously noted, the present invention is not limited to analysis of cells, but can also be used for analysis of sub-cellular components (e.g., mitochondria, endoplasmic reticulum, nuclear membrane, etc.), for example, using the same techniques described herein with regard to cells. Further, although this description focuses mainly on cells in an actual tissue specimen, any image-based cell assay can be processed in the same manner as described herein. Non-tissue cells, such as yeast cultures, blood specimens, cell lines, etc. can be imaged and analyzed according to the same techniques, software and hardware described herein. Still further, a flow of cells could be analyzed according to the description herein. For example, Amnis Corporation provides a flow cytometer that is capable of imaging individual cells with high throughput. In this situation, these cells can be analyzed and displayed by the present invention by generating an array of the images formed by the flow cytometer and treating the collection of cell images in the same way as a single tissue image 12 described herein. This collection of images further allows for additional processing possibilities, since the images in the array can be reordered. For example, the system could reorder the cell images to match an order of the cells resulting from a sorting or other computational operation performed on associated tabular data.

Figure 2:
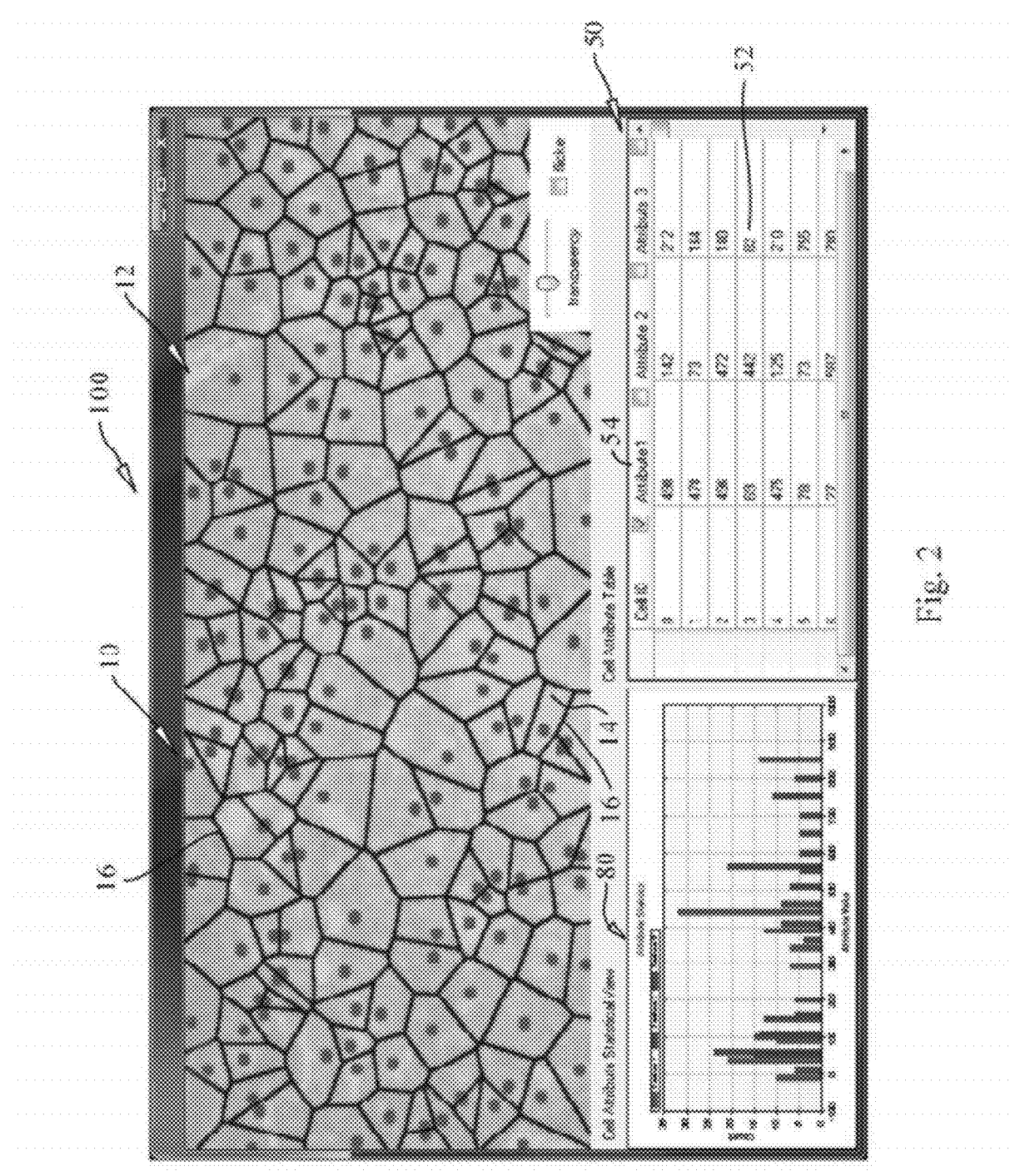
FIG. 2 shows the cell boundaries having been displayed on the original image from FIG. 1.

To practice the present invention, at least one image must first be acquired. This acquisition can be by direct production of an image, such as by use of a microscope or the like, or the image may be recalled from storage in memory, for example. Image 12 schematically shows such an image, with a plurality of cells 14 being shown. Note that the nuclei 15 of the cells 14 are schematically represented in the present figures as circular dots, whereas in actual images of cells, the shapes and sized of nuclei 15 would typically vary. Likewise, the cell boundaries have been schematically represented by straight lines, although variances in sizes and shapes are represented. Next, boundaries 16 (e.g., see FIG. 2) of the components 14 of the image are defined, using known existing algorithms, e.g., see Carpenter et al. (cited above), Comaniciu, D. and P. Meer (2002). "Cell image segmentation for diagnostic pathology." Advanced algorithmic approaches to medical image segmentation: State-of-the-art applications in cardiology, neurology, mammography and pathology: 541-558; Kachouie, N., P. Fieguth, et al. (2008). "Watershed deconvolution for cell segmentation", Engineering in Medicine and Biology Society, 2008. EMBS 2008. 30th Annual International Conference of the IEEE; and Meas-Yedid, V., F. Cloppet, et al. (2001). "Quantitative microscopic image analysis by active contours", Vision Interface Annual Conference, each of which is incorporated herein, in its entirety, by reference thereto. Note that these algorithms are useable for defining boundaries of actual images of cells or sub-cellular components having boundaries that do not necessarily follow straight lines. However, the defined boundaries 16 may be estimates of the actual boundaries and thereby represented as series of straight lines or a set of continuous curves that delineate the cell boundaries. It is also possible for the boundaries to be represented by bitmasks that are simply derived from known image processing techniques. If the boundaries are represented by an image layer which is itself an image, the cells can still be colored by flood filling techniques. As long as a coordinate representing the interior of the cell boundary is maintained to represent the cell location, the appropriate flood fill can be accomplished on a per-cell basis to generate the virtual stain effect. Thus, there are many ways to define the cell boundaries, including, but not limited to: a series of straight lines, a series of very small straight lines to make an arbitrarily complex polygon, a set of contours, an image of pixels that show only the boundaries which can then be overlaid on the original image, etc. As long as the method maintains a per-cell coordinate within each pixel boundary, colors can be flood filled within the boundary. Thus a pixel rendering of boundaries based on image processing techniques is a sufficient method as long as tracking of some interior point location per each cell is performed. One such method image processes for boundaries and nuclei and uses the position of the nucleus as the interior point for each cell. However, other techniques that track other interior locations may be substituted. In the example of FIG. 1, the components are cells 14 and therefore the boundaries determined in this instance are cell boundaries 16, e.g., cell walls. FIG. 2 schematically shows the cell boundaries 16 having been displayed on the original image 12 of the cells. Attributes can next be determined for the cells 14, wherein proper assignment of attributes to the cells from which the attributes were derived is made possible by the boundaries 16 delineating the cells.

Attributes can include, but are not limited to, size (e.g., cell size or size of a particular type of sub-cellular component), shape (e.g., cell shape or shape of a sub-cellular component), number of nuclei, etc. Attributes may also be quantitation values of the fluorescence of some molecule-specific dye, for example, to measure protein-expression or gene-expression in the cell. An attribute value can be representative of any characteristic of a cell that can be quantified. For example, some other attributes that have been quantified include, but are not limited to: texture and uniformity of color. In any case, each of the attributes can be quantitated and these quantitated, extracted values (e.g., numbers) 52 can then be displayed in a table 50 that can be displayed on the display 10 of user interface 100, such as shown in FIG. 2. In the example of FIG. 2, each row of table 50 represents a cell 14 measured from the image 12, and three attributes 54 (i.e., Attribute 1, Attribute 2 and Attribute 3) are quantitated for each of the cells 14. Table 50 is composed of tabular multivariable data. A number of different methods for displaying this data as table 50 are available. Methods/software for such displaying include, but are not limited to TableLens, see Rao et al., "The table lens: merging graphical and symbolic representation in an interactive focus+context visualization for tabular information," *Proceedings of the SIGCHI conference on Human factors in computing systems: celebrating interdependence*; Boston, Mass., US: ACM, 1994, pp. 318-322; and VistaClara, see Kincaid, "Vistaclara: an interactive visualization for exploratory analysis of DNA microarrays," presented at Proceedings of the 2004 ACM symposium on Applied computing, Nicosia, Cyprus, 2004; both of which references are hereby incorporated herein, in their entirety, by reference thereto. In further regard to VistaClara, U.S. Patent Application Publication No. 2004/0027350, titled Methods and System for Simultaneous Visualization and Manipulation of Multiple Data Types, is also hereby incorporated herein, in its entirety, by reference thereto.

Prior to displaying the data values in table 50, the data can optionally be dynamically filtered to remove uninformative data from the dataset so that the uninformative data is not displayed. One approach to dynamic filtering of this type involves the use of SpotFire, see Ahlberg. "Spotfire: an information exploration environment," *SIGMOD Rec*, vol. 25, pp. 25-29, 1996, which is hereby incorporated herein, in its entirety, by reference thereto. Thus, computational algorithms can be performed against the tabular data to perform dynamic filtering.

The Cell ID identifiers in the Cell ID column of display 50 provide tracking and identification of each cell (or sub-cellular component) in image 12. As noted, in order to do per-cell (or per-sub-cellular component) measurements via image processing, the image 12 is first segmented to define the cell (or sub-cellular component) boundaries 16. For each defined cell or sub-cellular component defined, an arbitrary identification number (typically a consecutive numerical numbering) is assigned that can be used to both reference the cell (or sub-cellular component) boundary 16 in the image 12 as well as the attributes 56 (and other associated data, such as class, cluster, other metadata, etc.) in table view 50. Likewise, these Cell ID's can be used to link to specific data in the graphical view of display 80. Thus Cell ID's are data structures that map boundaries 16 and/or an interior location of the cell or sub-cellular component to the measured attributes 56, as well as other data and metadata that may be provided in views 50 and 80.

Additional metadata about the cells can be added to the table 50. For example, a pathologist may want to add manually produced annotations about cells that, for whatever reason, the pathologist finds to be particularly interesting. It is also possible to either manually select, or select according to a result of a computation performed, a group of cells and provide them all with a single annotation. Such annotation then appears on a per-cell basis in the table 50. Such metadata can then be used for classification purposes, such as by using t-tests or other statistical procedures to extract out image-based attributes that best discriminate the metadata classes upon which the procedure is based.

Once the attributes 54 of the cells 14 have been quantitated, various statistical plots and/or graphs 80 can be generated and displayed to better visualize the numerical relationship between the attributes. For example, in FIG. 2, statistical plot 80 in the form of a histogram is displayed, showing all three of the attributes 54 plotted by color coded bars, relative to the attribute values. However, graph/plot 80 is not limited to a histogram, but can be a scatter plot, parallel coordinates plot, etc.

Computational methods can be used to analyze the attributes data in table 50. Examples of such methods include, but are not limited to: supervised clustering, unsupervised clustering, and/or principle component analysis. The results of analysis by a computational method may optionally be displayed in the graph/plot 80 display for viewing by a user.

The per-cell (or per-subcellular component, depending upon the application), attribute measurements or calculations, i.e., the attribute values 52 are next assigned a color gradient mapping. The numerical attribute values 52 are thus represented as gradients of color to be displayed on image 12. For each attribute the value can be encoded by varying the intensity of the attribute's color in proportion to the value. This color gradient provides a visual representation of the attribute values so that variations in attribute values can be visually perceived across the population of cells/sub-cellular components. There are many ways to generate color gradients for this purpose, include, but not limited to: varying "lightness" in the HSL (hue, saturation, lightness) color model; varying saturation in the HSL color model; varying saturation and lightness in the HSL color model; or variations of one or more variable using the HSV (hue, saturation, value) color model. The present invention refers to variations in "intensity" or "color intensity" to refer to the color gradient. Therefore, the terms "intensity" and "color intensity" are used to refer to color gradient generically, but not to any specific method used to create the color gradient. In this example, attribute 1 is assigned a red color, attribute 2 is assigned a green color and attribute 3 is assigned a blue color, so that the representations of the three different attributes can be readily and easily visually distinguished. Color intensities of these attributes are varied to represent the quantitative values amongst the attribute values of a particular attribute. Thus, for example, a bright red color represents a relatively high value of attribute 1, whereas a pale (i.e., pink) red color represents a relatively low value of attribute 1. Since the components (in this example, cells) 14 have already been delineated at this stage by boundaries 16, a simple flood fill operation can be performed to paint the appropriate color into each cell 14 to represent the per-cell value of the attribute.

Figure 3:
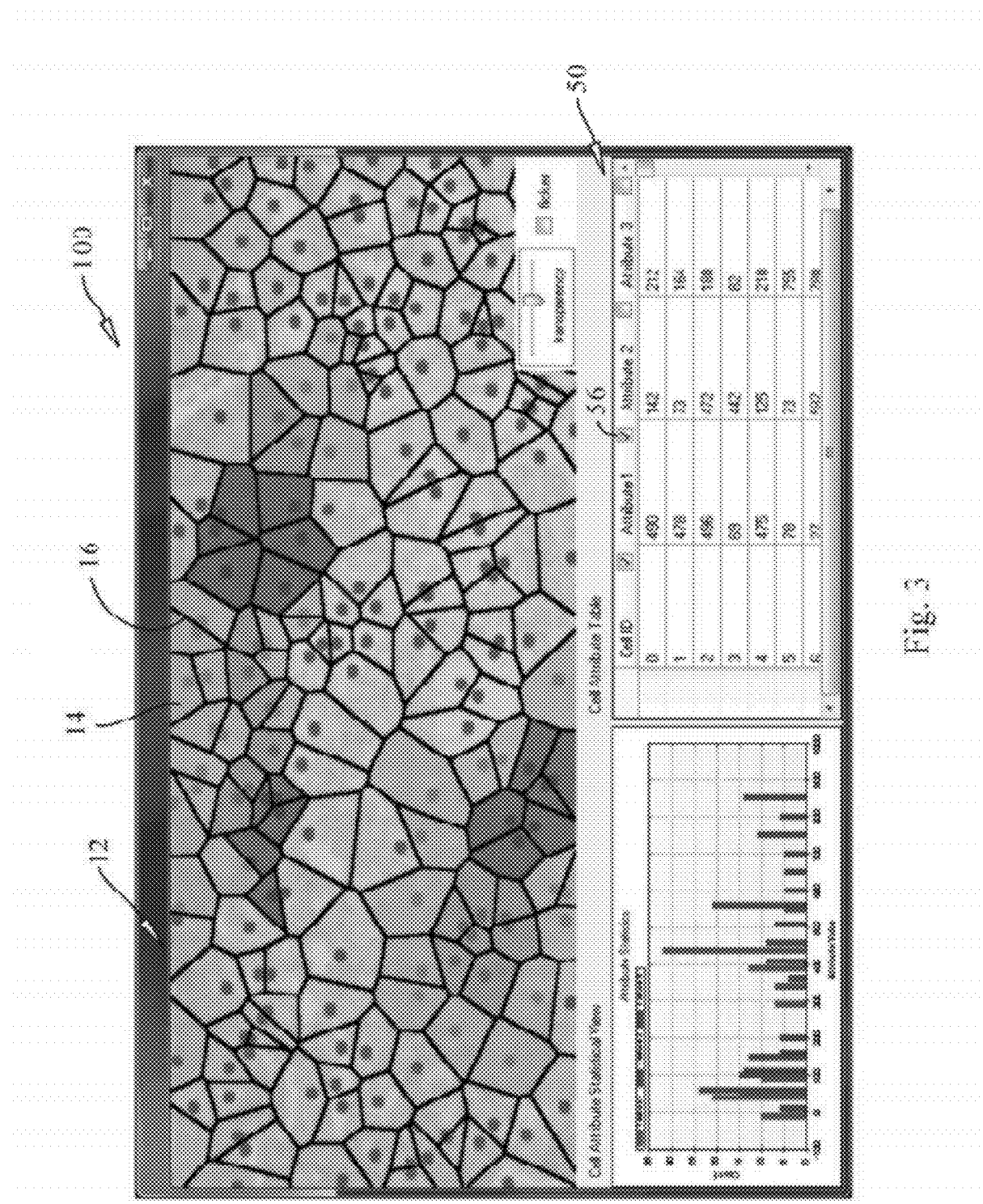
FIG. 3 schematically illustrates an example where the user has selected only attribute 1 to be displayed on the cell image.

FIG. 3 illustrates an example where the user has selected only attribute 1 (and cell boundary outlines) to be displayed on the cell image 12, by selecting feature 56, such as by mouse-clicking on the selection boxes 56 that select all members of the column selected, for example. The selection box 56 for "Cell ID" can be checked or unchecked to enable or disable, respectively the cell outlines (boundaries) generated by segmentation, as referred to above. However, selection box 56, in each instance is only one example of controlling the display (or lack of display) of the attributes, as other control schemes or mechanisms could be substituted. By selecting in this manner, the user has instructed the user interface 100 to virtually stain the cell image 12 to represent the values of attribute 1 in the cells where it exists in an amount that was significantly measured or calculated when attribute quantitation for all cells 14 in the image 12 was performed, in addition to displaying cell boundaries. FIG. 3 shows the results of such virtual staining, where the cells having significant values for attribute 1 have been virtually stained in various intensities of the color red. Note that this process is referred to as "virtual staining" because the resulting image appears like an image of cells that have been processed to be actually stained for an attribute. As noted, this feature can be very user friendly to users who are already in the habit of visually reviewing images of cells that have been actually stained. Upon reviewing the virtual staining of FIG. 3, a user can readily distinguish the more intensely colored cells 14 from those with pale or no color, and can also observe that there is some apparent structure to the more intensely colored cells. By alpha-blending the colors used for virtual staining in a transparent manner, the underlying cell images can bleed through and be viewed along with the virtual stain coloring, making it appear as though the cells have been physically stained with a dye.

Figure 4:
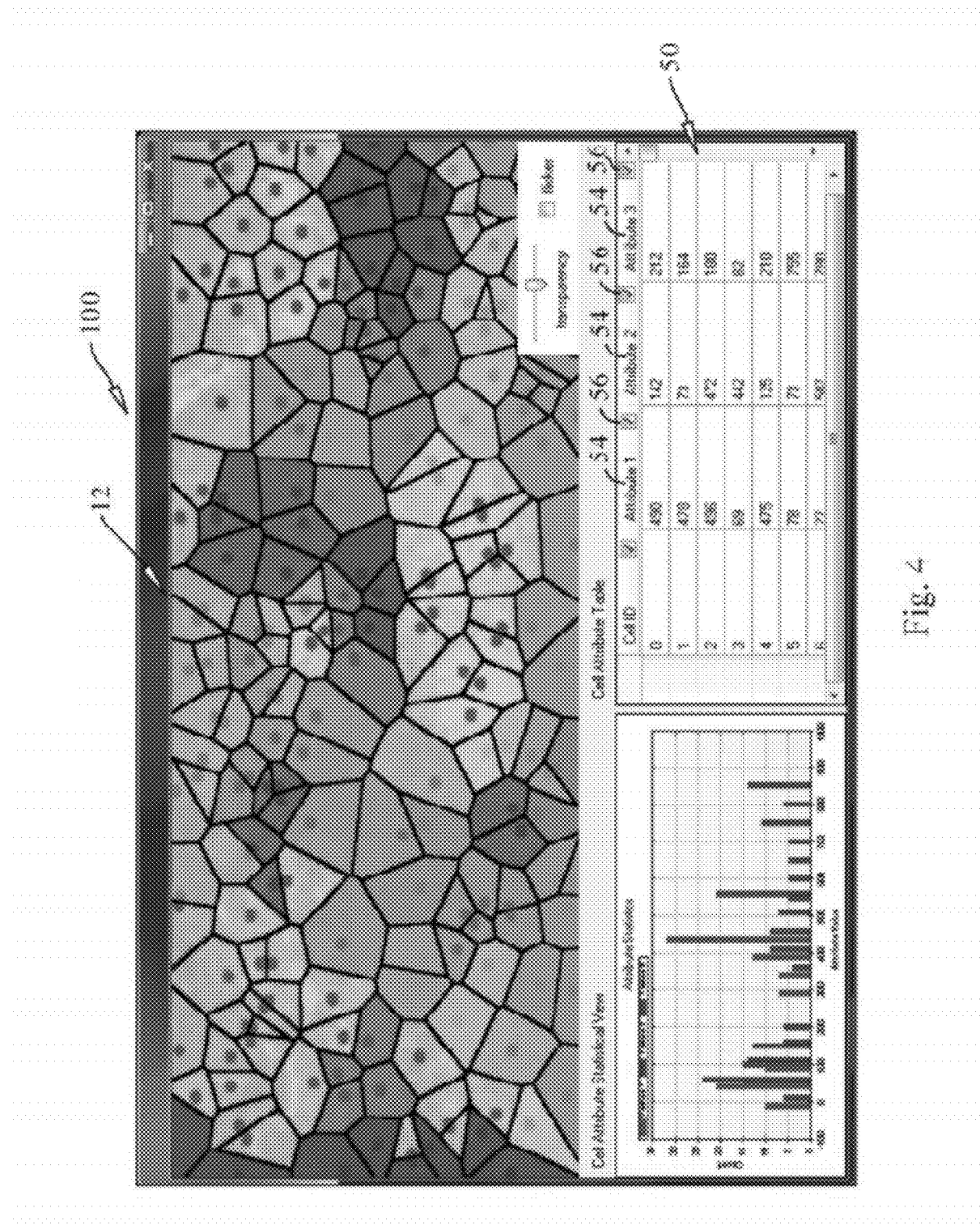
FIG. 4 schematically illustrates an example where three different attributes have been selected for display on the cells image.

The user is provided flexibility to combine attributes and thus display any combination of attributes desired on the image 12. For example, in FIG. 4, all three attributes 54 have been selected 56 for display on all cells 14 (all cells having been selected by checking attribute box feature 56 for that column) from which the attributes were measured and/or calculated. In image 12 display 10 shows cells 14 characterized by only one of the attributes as shown by a color of red, green or blue. However, when more than one attribute is present in a cell, the colors become mixed. For example, cells 14 that include attribute 1 and attribute 2 are shown in a yellowish color, while cells having attribute 1 and attribute 3 result with a virtual stain having a purple color. With practice, a user can become adept at discerning which underlying colors have combined to form a particular color and therefore which attributes are being displayed in any given cell. Alternatively, the user can modify the selections, to remove an attribute and then note any change in the color appearance of a particular cell or other component of interest. Different combinations of selecting and deselecting can be performed until the user positively identifies the individual attributes that are being represented by a combination color.

Once the numeric data of the attributes 54 and the image data of image 12 have been integrated by the system, such as by linking, and are displayed on the display 10 of the user interface 100 as shown and described above, the user is provided with a variety of very useful functions that can be initiated and carried out by interactive selection by the user, examples of which are described below.

Figure 5:
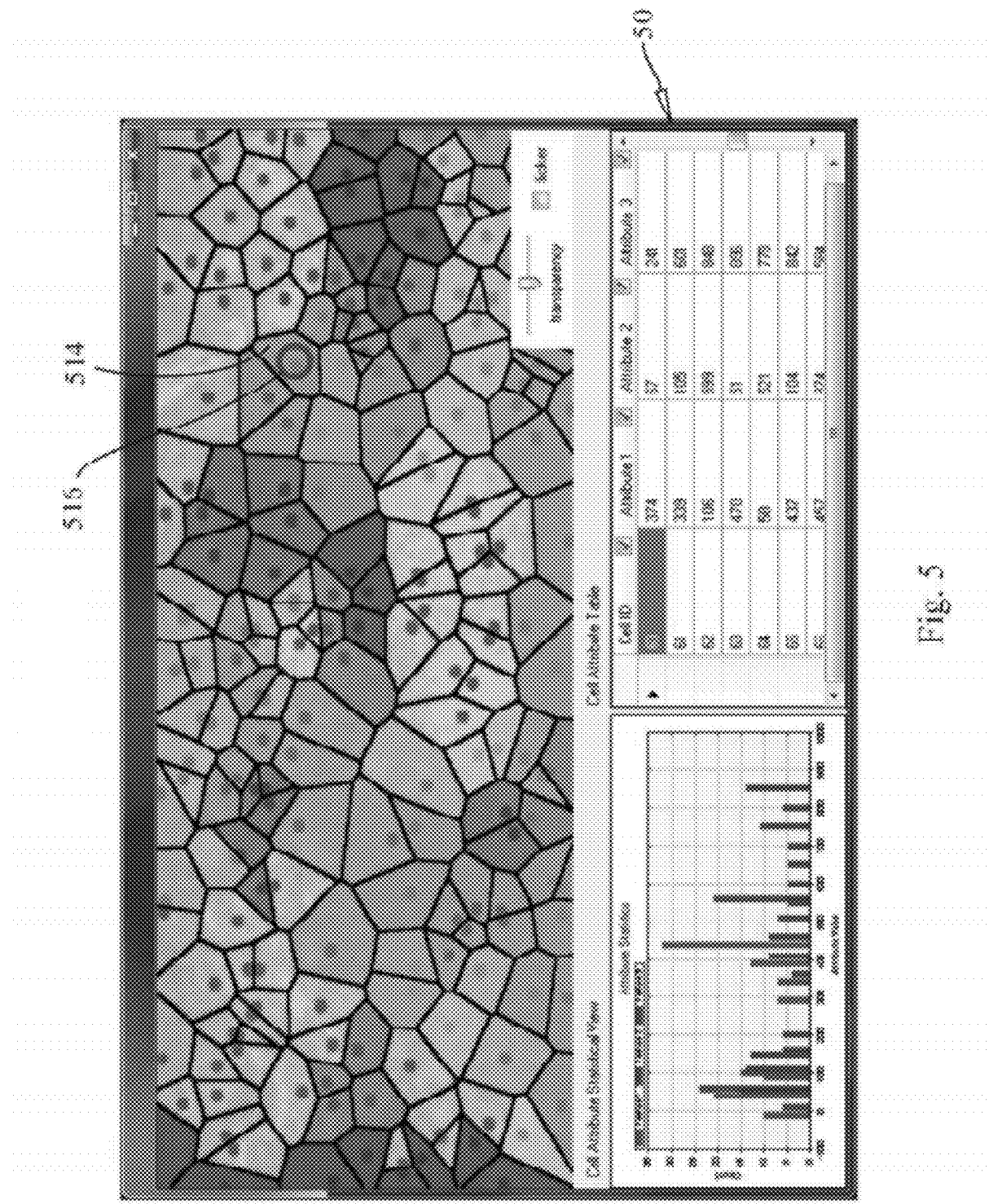
FIG. 5 schematically illustrates an example, where a user has selected a cell on the cells image, and the system scrolls to the data for that cell in the table image.

FIG. 5 illustrates one example, where the user has selected cell 514, such as by moving a cursor over the image of cell 514 in interactive image 12 and mouse clicking, striking the "enter" key, or performing some other user initiated action on the user interface causing the particular cell 514 to be selected, for example. Indication that the cell has been selected may be shown by a graphical indicator 516, such as the circle shown, or other graphical indicator. The selection of the cell. 514 causes the system to automatically scroll the table 50 to display the row for the selected cell, in this case "Cell ID 60", as shown in table 50 in FIG. 5. Optionally, the Cell ID number and/or the attribute values of the selected cell may be highlighted in table 50 upon scrolling thereto. In any case, by automatically scrolling to the attribute values in table 50 for the cell that is selected in the image 12, this makes it possible for a user to easily inspect numerical data for a cell of interest in the image 12 and thereby integrates the useful information obtained by viewing the actual cell image with the numerical data having been measured and/or calculated.

Figure 6:
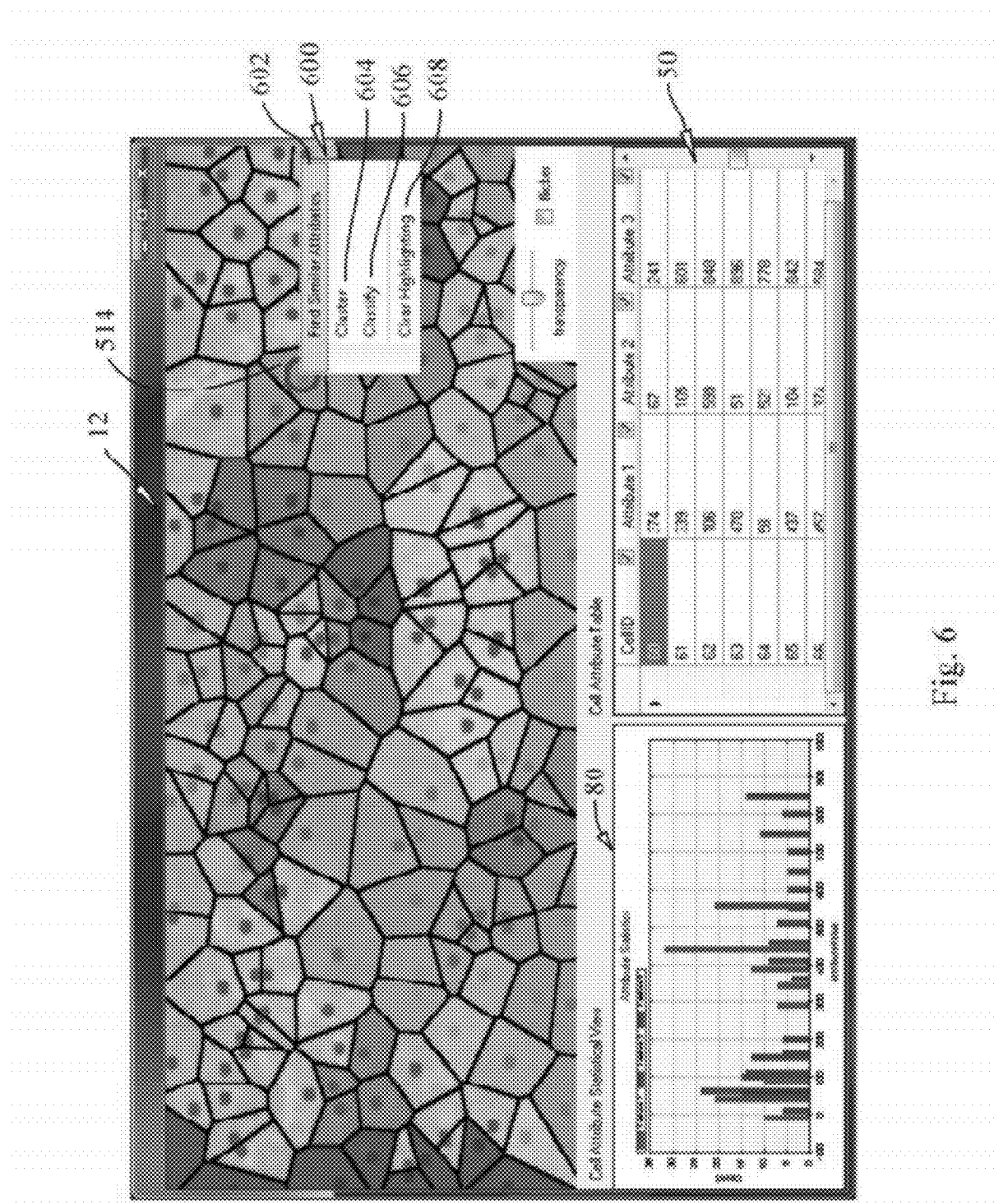
FIG. 6 schematically illustrates examples of additional functions that may be provided according to an embodiment of the present invention.

By performing another selection operation, user interface 100 can display additional functions that are available to be performed with regard to the selected cell 514. For example, if cell 514 is selected by clicking the left mouse button as the cursor is located over the cell 514, by clicking right mouse button (or striking the enter key, or some other designated keystroke or form of instruction to display a popup menu or other display of additionally available functions), a popup menu is displayed that lists the additional functions that are available, as illustrated in FIG. 6. Popup menu 600 has been displayed by invoking it using a right mouse button click or other alternative method of invoking the display of menu 600. Examples of additional functions include, but are not limited to: the "find similar attributes" function 602, "cluster" function 604, a "classify" function 606 and a "clear highlighting" function 608. Selection of the "find similar attributes" function 602 initiates a process by the system that finds all cells (or sub-cellular components) with a similar attribute profile. In this example, the attribute profile is defined by the absence or presence of each attribute in the cell. Thus, in this case, the system finds all other cells that have both attributes 1 and 2 (i.e., detectable values greater than zero of attributes 1 and 2) and do not have attribute 3 (i.e., zero, or non-detectable value of attribute 3).

Figure 7:
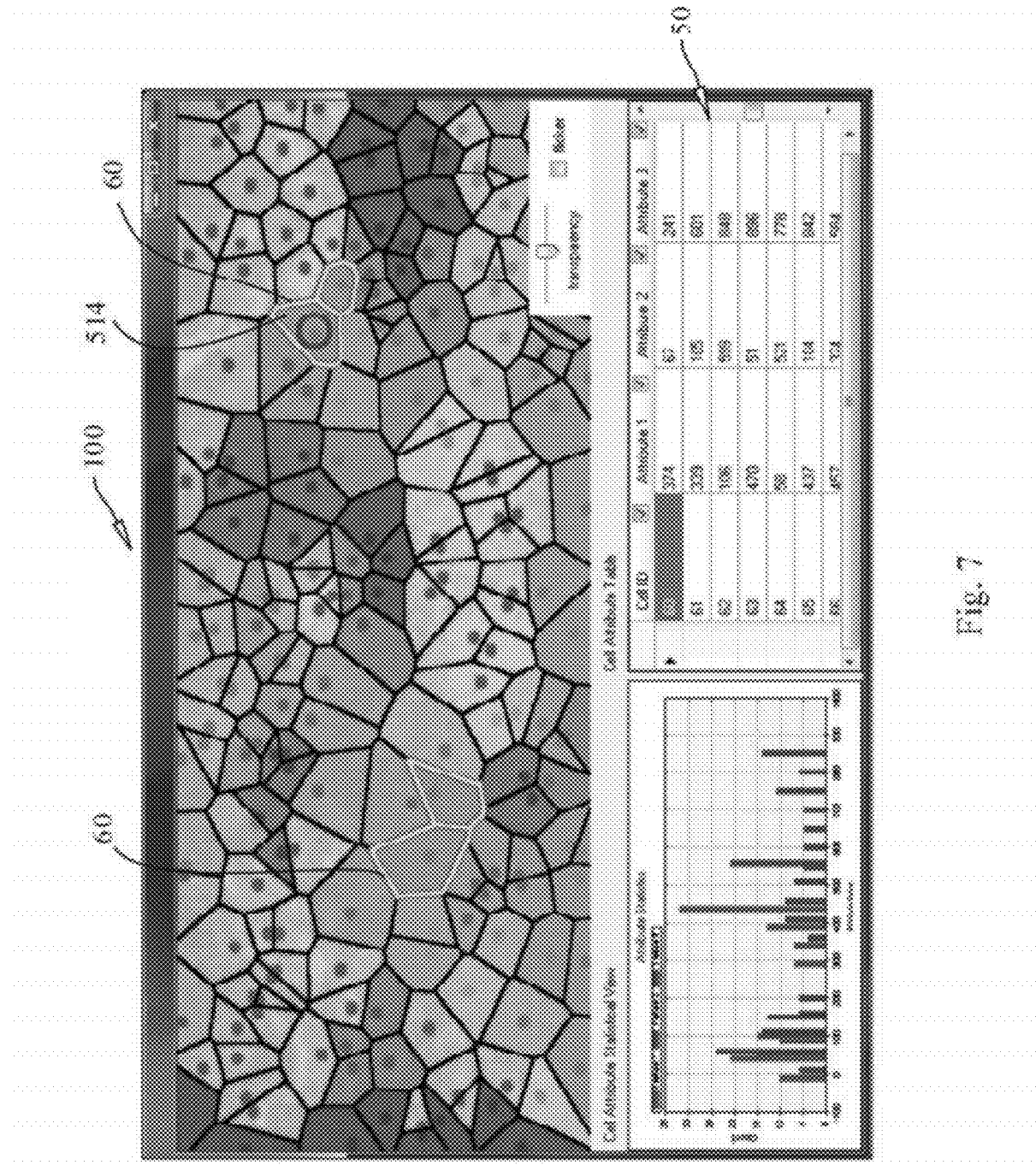
FIG. 7 schematically illustrates the results of a "find similar attributes profiles" function having been carried out by the system.

FIG. 7 illustrates the result of selection of the "find similar attributes" function 602 in the example of FIG. 6, wherein the system highlights the identified cells having been identified as having similar attributes. In this example the highlighting is performed by yellow outlining 60 of the identified cells. It is noted that similar attributes profiles searching according to the present invention is not limited to finding those cells that have a matching combination of attributes that are present and absent. Alternatively, or additionally, the present invention may provide a function where not only do identified similar cells need to have the same combination of attributes present and absent, but, where present, the attributes each need to be within a range of intensity defined by the corresponding intensity of that attribute in the selected cell 514 plus or minus a threshold value, which can be set by the user. Optionally, two threshold values may be set, one within which values above the selected intensity must reside and one within values below the selected values must reside. Further, individual settings for each attribute may be made. A default setting wherein all thresholds for the attributes are predefined and preset may be used as a default if the user does not choose to set the thresholds.

The attribute values of a cell can be considered as a series of numeric measurements that constitute a vector of measures. Thus, for example, such a vector constructed from the attributes of the selected cell 514 can be compared for similarity to vectors constructed in the same manner for other cells in the visualization, and similarity calculations can be performed using techniques which may include, but are not limited to: Euclidean distance, Pearson correlation, etc. For some similarity measures where the attributes have vastly different ranges in values, it may be necessary to normalize the attributes to vary over equal ranges to avoid overweighting some attribute types and underweighting others. It is also possible to use rank-ordered measures such as the Spearman rank correlation instead of the Pearson correlation. Since the calculation is based solely on rank ordering the values, the difference in ranges between different attribute types is irrelevant. Selection of profiles within a specific similarity range may alternatively be used to identify dissimilar cells, where the range is outside of another range that one would ordinarily consider to show cells that are similar.

The tabular view 50 of cells can also be reordered by the calculated similarity values to show specifically which cells have been identified by the calculations and threshold(s) as being similar Selection of the "cluster" function 604 causes the system to cluster the cells according to any of the clustering methods identified herein, wherein clustering is performed on attributes profiles. By selecting the "classify" function 606, the system classifies cells and/or sub-cellular components. Various methods can be used to classify such entities using similarity of attribute profiles as a distance measure. For instance, one or more classes of cells might be represented by the average of profiles for known instances of each class, such as diseased vs. healthy cells. A nearest neighbor classifier can then determine for each cell which type it is most like based on its attribute profile and all cells could be classified as healthy, diseased or perhaps unknown (for ambiguous cases that fall between healthy and diseased). Threshold values for the distances may be assigned, so that when a particular profile is not close to any of the defined classes so as to be within a threshold distance value, that particular cell or subcellular component represented by the particular profile is assigned to the "unknown" class.

Figure 8:
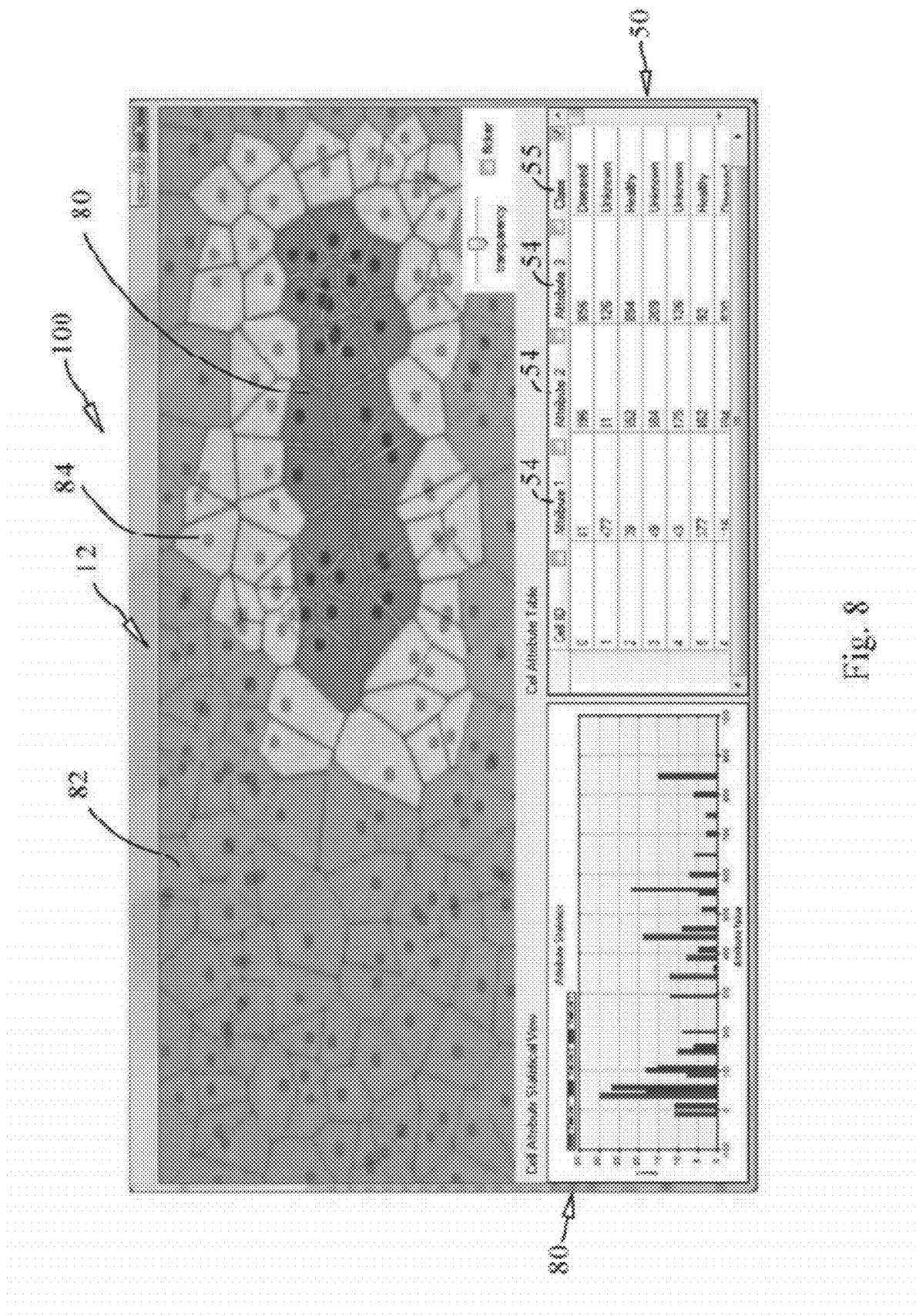
FIG. 8 schematically illustrates an example of staining cells by Class.

These classes can be additionally displayed in an extra column, e.g., see "Class" 55 in view 50 of FIG. 8, wherein each cell is classified as "Diseased", "Healthy" or "Unknown". These classed can be used for staining the view 12 in any of the ways already described. Additionally or alternatively, a special stain or highlighting may be provided and applied to clearly visually represent that stained classes are being displayed in view 12. The "special" nature of the staining is characterized by the fact the staining/coloring is not attribute-based, but rather class-based. Thus, rather than providing a different color for each attribute selected, image 12 can be virtually stained using a different color for each class, as illustrated in FIG. 8, where cells having been classified as "Diseased" are stained in red 80, cells having been classified as "Healthy" are stained in green 82, and cells having been classified as "Unknown" are stained in yellow 84.

Figure 9:
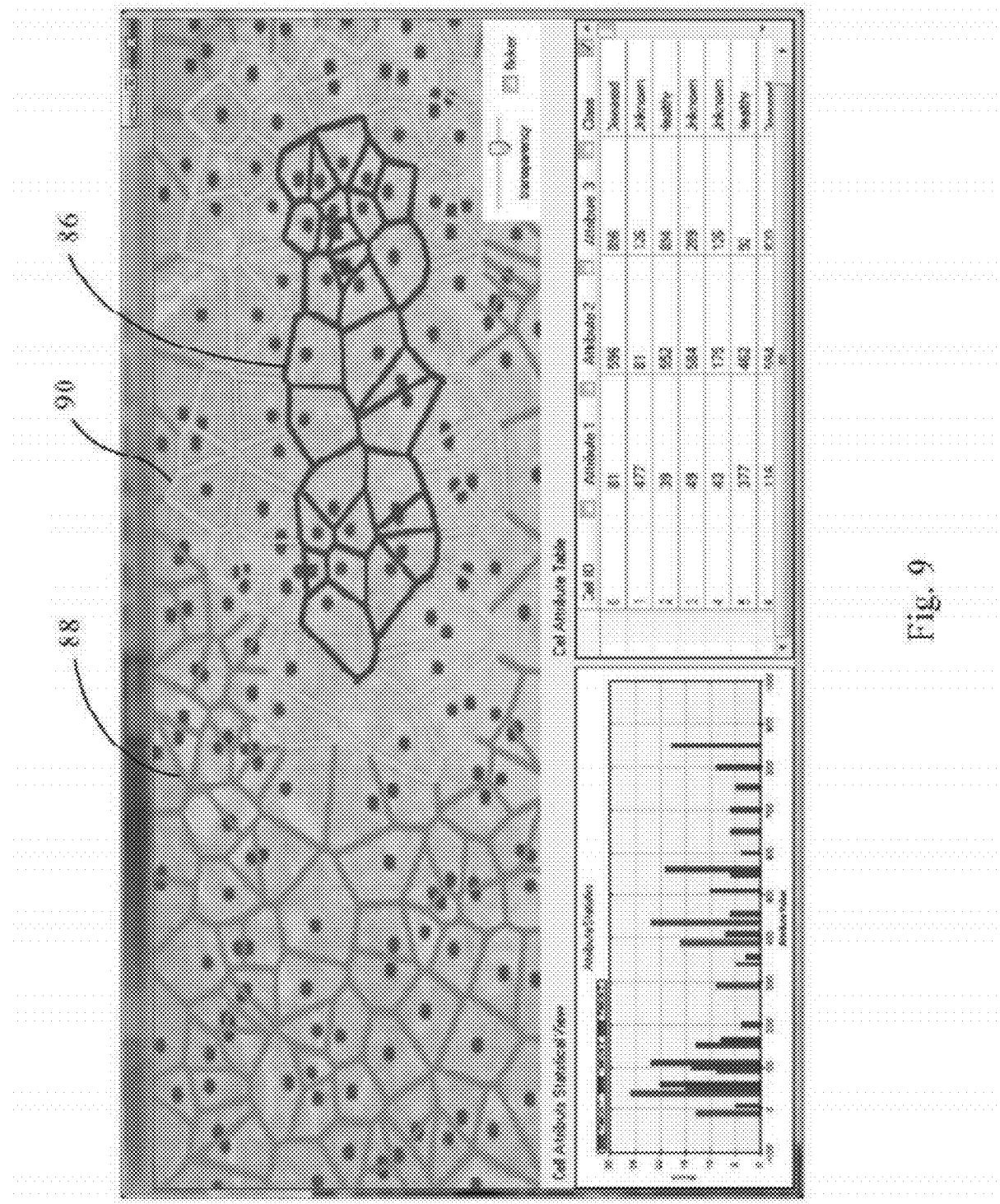
FIG. 9 schematically illustrates another example of staining cells by Class.
Figure 10:
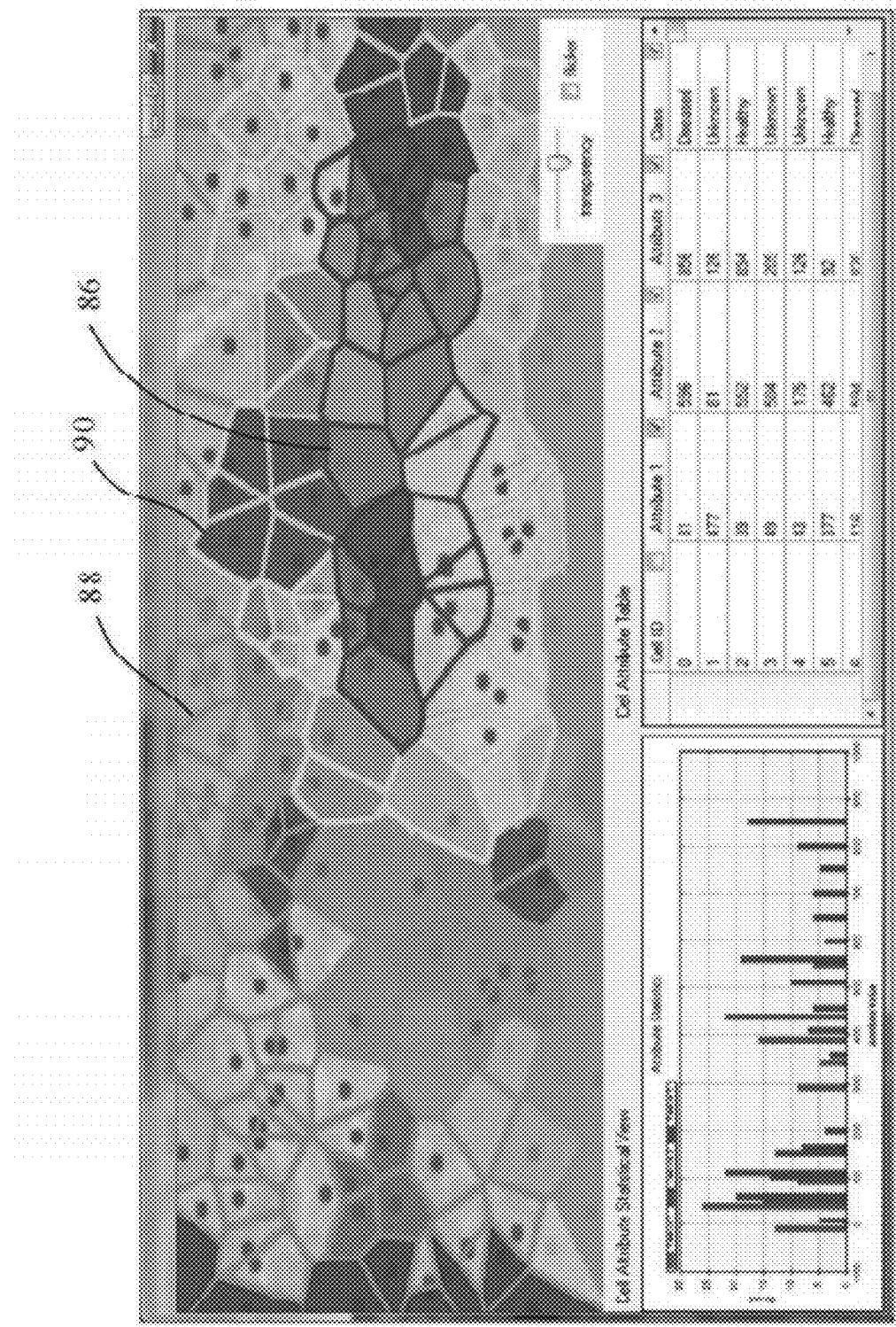
FIG. 10 illustrates an example wherein cells are stained for attributes as well as for Class.
Figure 11A:
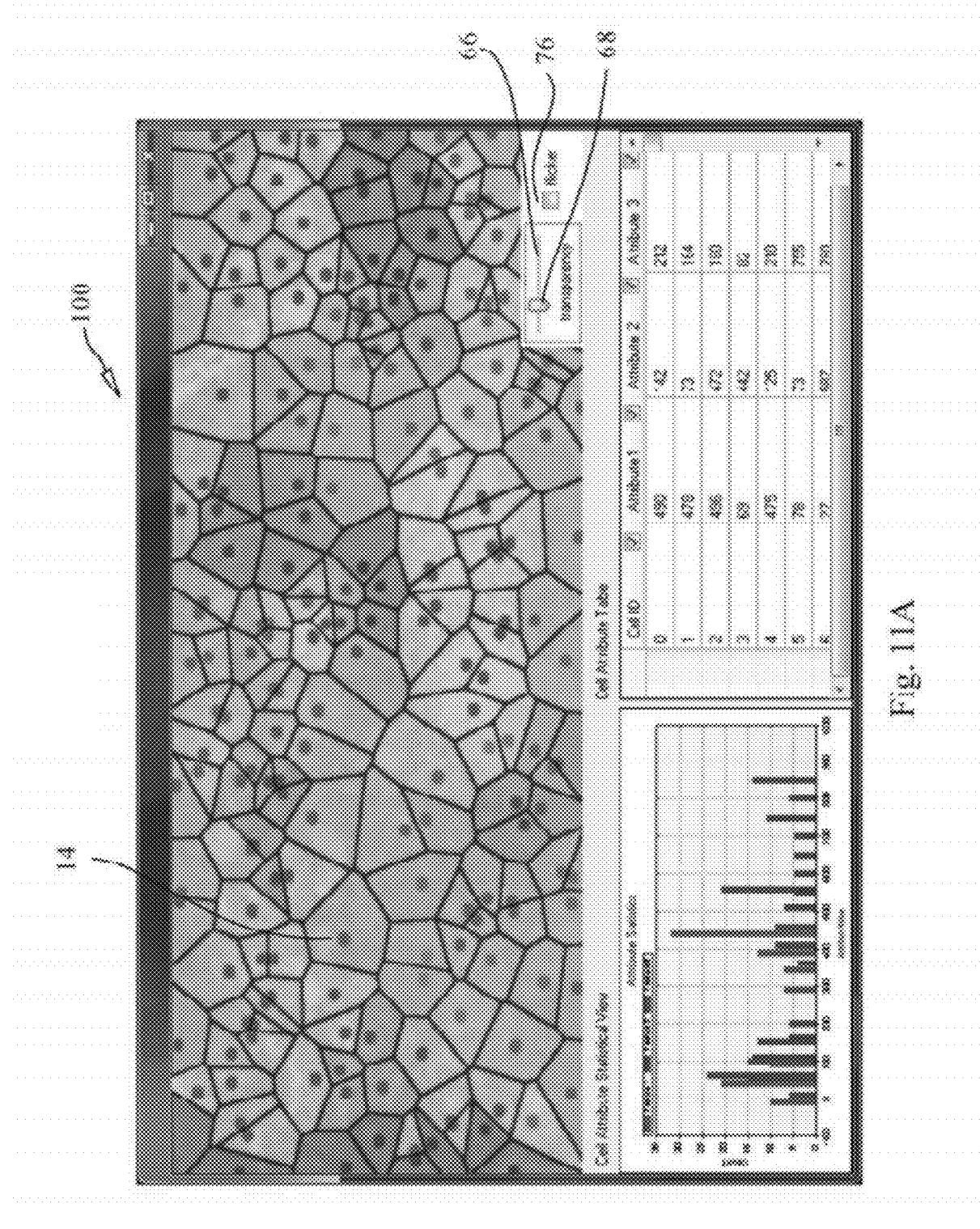
FIG. 11A schematically illustrates an image having relatively greater transparency of the color fills for the attributes.
Figure 11B:
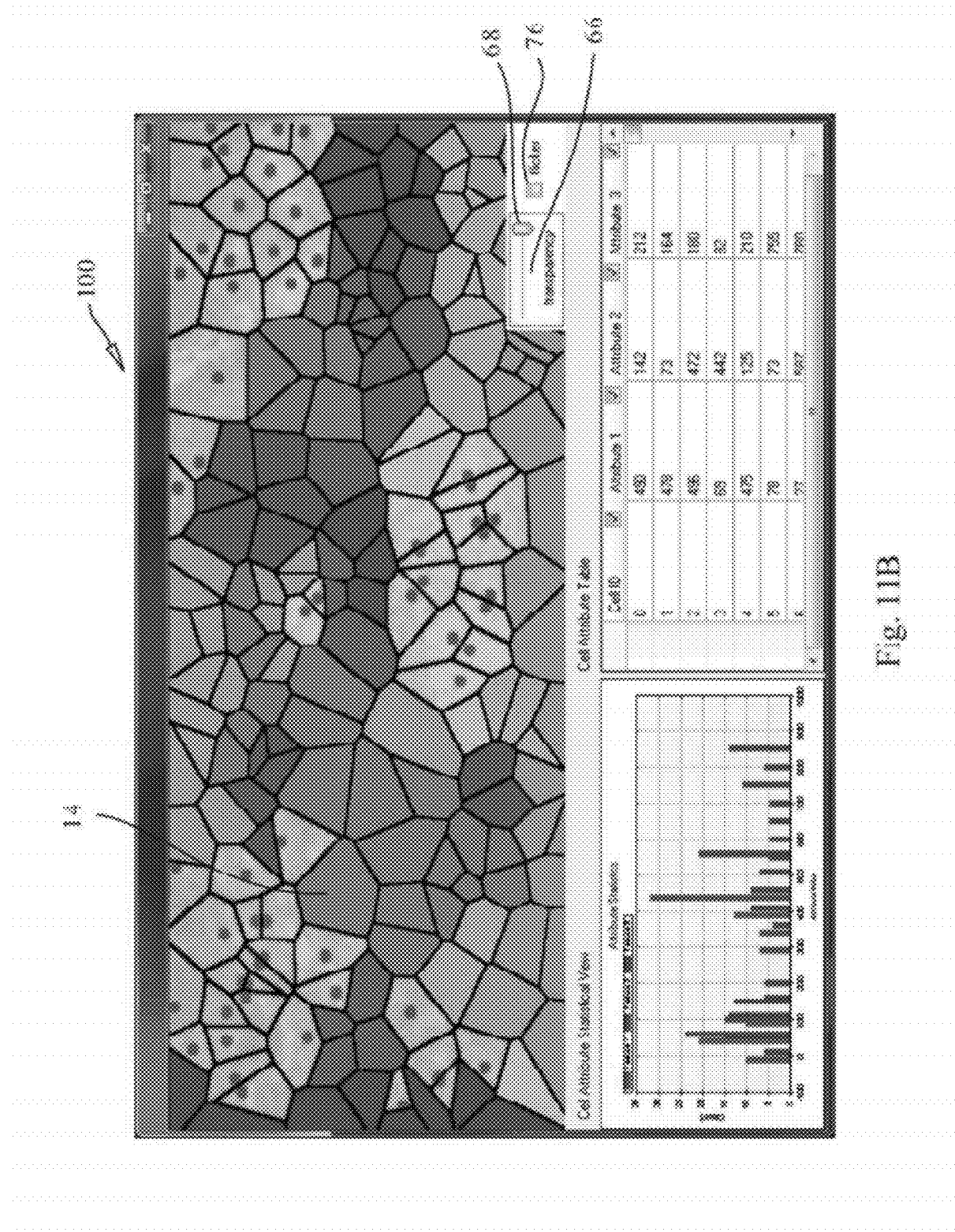
FIG. 11B schematically illustrates an image having relatively greater opacity of the color fills for the attributes.
Figure 12:
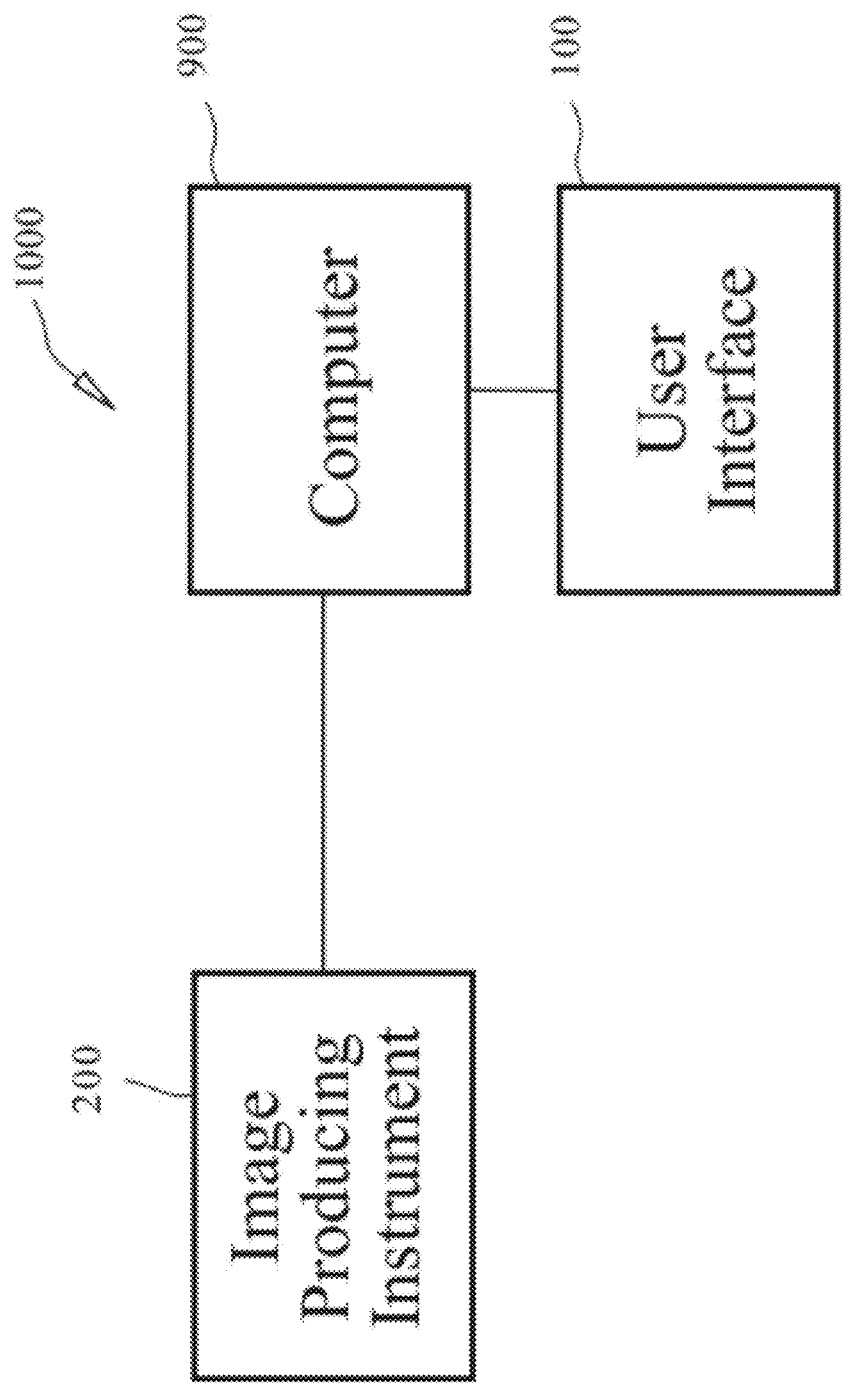
FIG. 12 is a schematic representation of a system according to and embodiment of the present invention.
Figure 13:
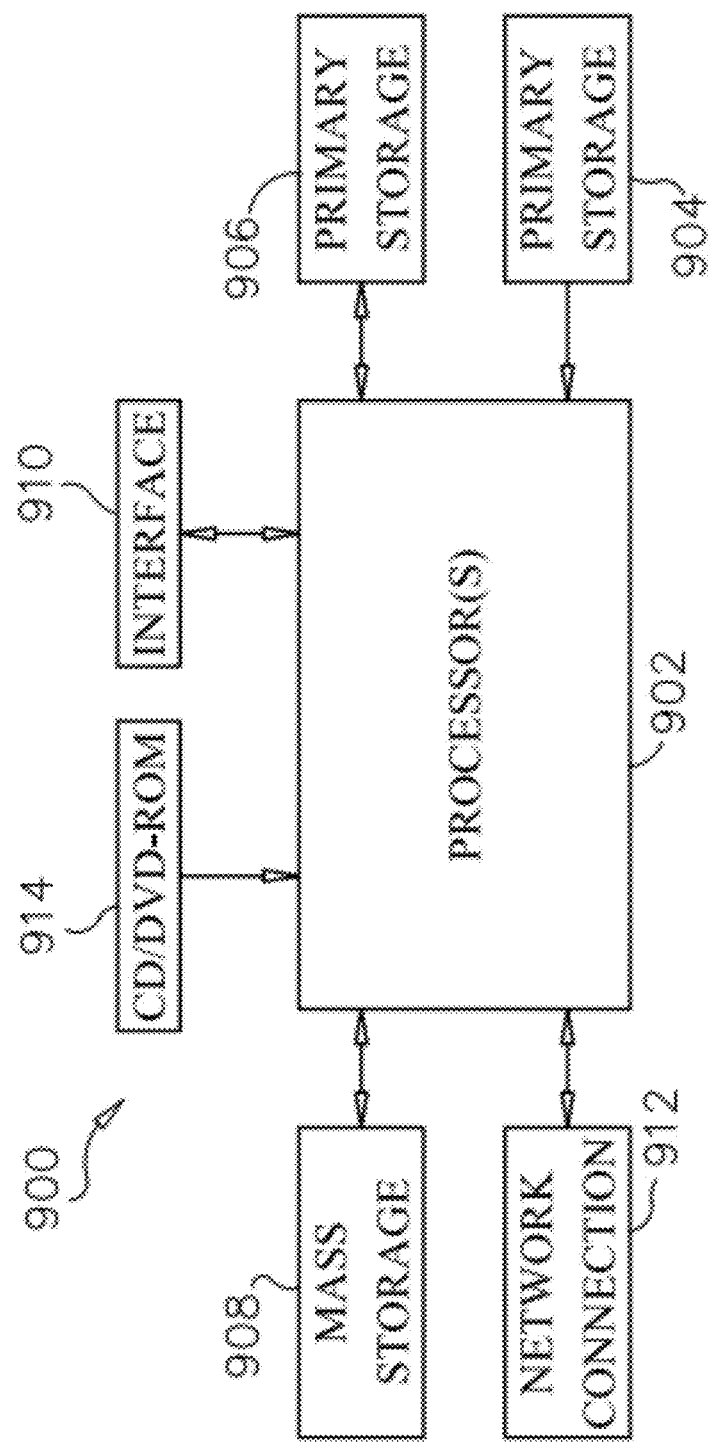
FIG. 13 schematically illustrates an example of a typical computer system that may be incorporated into the system according to an embodiment of the present invention.

Alternatively, a differently colored boundary highlight may be displayed around the respective cells (e.g., outlined) to indicate their classification. This is illustrated in FIG. 9, where cells having been classified as "Diseased" are outlined in red 86, cells having been classified as "Healthy" are stained in green 88, and cells having been classified as "Unknown" are stained in yellow 90. Although shown without attributes having been stained in FIG. 9, alternatively, one or more attributes may be stained by painting in the bodies of the cells at the same time that classifications are represented in the manner described with regard to FIG. 9. This is illustrated in FIG. 10.

Thus, staining representing classes of cells or sub-cellular components may replace or overlay any existing virtual stain being viewed. There are many known distance-based classifier algorithms that can be used with this approach, such as the distance/similarity based example described above; the known k-nearest neighbor classifier, or other known classification techniques that are based on vectors of attributes, including, but not limited to "linear classifiers" and "quadratic classifiers". One way that classification differs from clustering is that classification is performed to identify known classes, and possibly one unknown class, wherein clustering is more unsupervised in grouping together similar profiles, wherein the resultant clusters are not necessarily representative of known "classifications". Selection of the "clear highlighting" function 608 clears any highlight used to indicate similar cells/components that is currently appearing in display 80.

Alternatively, using the same similarity measures, cells can be clustered by selection of the "cluster" function 604 (using either supervised or unsupervised clustering, e.g. k-means vs. hierarchically) to group cells into clusters. These clusters are selectable by the user for highlighting in the cell view 12. These clusters can be added in an extra column of the view 50 in the same manner described above for "Classes". Rather, than listing classes (e.g., "Healthy" "Diseased", "Unknown"), the additional column in view 50 may be labeled "Cluster" and each cell would the be assigned to a cluster or unassigned (e.g., "Cluster 1", "Cluster 2", "Cluster 3", etc. or "Unassigned). Likewise, these cluster assignments can be used for staining in the ways already described above with regard to staining using Class assignments. Like classes, alternatively or additionally, a special virtual stain can be applied to represent clusters directly. This special stain may replace or, alternatively, overlay any existing virtual stain being viewed.

Further, multiple selections of cells can be made by the user, whether the cells are contiguous or not, and similar functions can be carried out to those described above. The function for finding similar attributes profiles or similar computationally derived classes can be carried out by performing these functions based on an average attributes profile of the selected cells. The profile values may be integer or floating point values in which case the values can be averaged, so that an average/composite profile can be used to search for similar profiles. It is also possible to select regions of the histogram of properties 80. For example, for a histogram of cell size, a user may notice that the cell sizes appear to be distributed in the histogram in what resembles a Gaussian distribution, except that there are a few extreme outliers on one tail of the distribution, which would be clearly considered to be outliers of the Gaussian distribution. In such a case, the user may select the presumed outliers, which would then highlight them in the cell image view 12.

Because the virtually stained image is a construction, it can be manipulated in ways not possible with images having been physically stained with some types of stains or dyes. As noted above, the cell coloring in image 12 is achieved with "alpha blending" to blend colors, rather than to just paint over them. The degree of blending can be adjusted to either emphasize the attribute data (the colors) or to better see the underlying image data (the data of the original image and boundaries, e.g., in FIGS. 1-7, the cell boundaries, nuclei, etc. FIG. 8A shows the results when the blending is adjusted to emphasize the underlying image data, and FIG. 8B shows a result when the blending is adjusted to emphasize the attributes data. As can be seen, the attributes coloring of the cells 14 is almost completely transparent and the cell boundaries and nuclei can be easily viewed in FIG. 8A. In FIG. 8B however, the attributes coloring is very pronounced and nearly opaque and the nuclei and some cells 14 cannot be seen. Variations of this blending can be performed. The user interface 100 is provided with a user controllable slider 66 that can be used to vary the blending. In FIG. 8A, the user has slid the slider control 68 almost all the way to the left to provide the very transparent view of FIG. 8A, whereas, in FIG. 8B, the slider control has been slid all the way to the right to provide the opaque view of FIG. 8B. Note that the slider scale is a continuous scale, so that continuously varying amounts of opacity/transparency can be achieved by sliding the control 68 of slider 66 to any desired position between transparent (extreme left) and opaque (extreme right).

Even with highly transparent overlays (i.e., where the color filling representing attributes is highly transparent), fine details of the original image may be obscured. To provide a further tool to allow the user to see the original image completely unobscured by the attributes fill coloring, but still allow the user to compare this view quite readily with the image having been virtually-stained, the user interface 100 is further provided with a user selectable "flicker" function. By selecting on the flicker function box 76, the user causes the user interface 100 to automatically fade between an image 12 showing no transparency, i.e., like that shown in the example of FIG. 8B, to an image having total transparency, similar to that shown in FIG. 8A, but with no color fill for the attributes being visible. Alternatively, the flicker function could cause automatic reverse fading from full transparency to full opacity. Further alternatively, the flicker function may combine both fading and reverse fading, so that a cycle goes from full opacity faded to full transparency and reverse-faded to full opacity. In any of these alternative cycles, the flicker function can be preset with a predetermined cycle time. In one example, this cycle time was about one second. Optionally, the user may be provided with a user-settable feature for setting the cycle time. Such feature, could be in the form of a slider, like slider 66 shown for varying the transparency/opacity blending (or the same slider 66 can be used to vary the cycle when box 76 is selected) or a menu could be provided, or the like. The animated coloring provided by the flicker function allows the user to concentrate on both the attributes data and the features of the original image in rapid succession.

As noted previously all views on the display 10 are linked by the system. That is, image view 12, table view 50 and graph/plot view 80 are all linked. In this way, selection of one or more cells (or sub-cellular components, in an alternative embodiment) in image 12 by a user causes the user interface 100 to automatically select the corresponding cell data in the views 50 and 80. Likewise, selecting one or more cells (or sub-cellular components, in an alternative embodiment) in table 50 by a user causes the user interface 100 to automatically select the corresponding cell data (or sub-cellular component data) in the views 12 and 80. Also, selecting one or more cells (or sub-cellular components, in an alternative embodiment) in graph/plot 80 by a user causes the user interface 100 to automatically select the corresponding cell data in the views 12 and 50. With this functionality, an insight observed by a user in one of the views 12, 50 or 80 can be immediately viewed in the context of the other views. In the case of graph/plot 80, a statistical outlier might be readily observed in this view by a user. By selecting on this statistical outlier, the user then causes the user interface 100 to identify in image 12 (such as by highlighting, or displaying a marker on the cell) and in table 50 (by scrolling to the row of the cell, and optionally, highlighting) the same cell identified by the outlier selected in the graph/plot 80, without any effort on the part of the user.

FIG. 9 is a schematic representation of a system according to and embodiment of the present invention. System 1000 may include computer 900 and user interface 100. System 100 may be linked to an image producing instrument 200 such as a microscope, flow cytometer or other instrument configured to produce an image of a cell, cells or sub-cellular components. Alternatively, image producing instrument 200 may be integrated into the system 1000. Additionally, or further alternatively, computer 900 may be integrated into user interface 100.

In at least one embodiment, user interface 100 is configured to operate on a live (i.e., real-time) image, so that image 12 displayed by user interface 100 is a real-time image from instrument 200. In at least one embodiment, the instrument 200 comprises a microscope and user interface 100 displays a real-time image 12 received from microscope 200. When instrument 200 is a digital microscope rather than an optical microscope, the real-time image 12 displayed by user interface is a live (i.e., real-time) video image. This video image can be computed on a single capture frame or, alternatively, on more than one capture frame, including, and up to, all capture frames. Real-time virtual staining as described herein can then be accomplished on any and all capture frames having been computed.

FIG. 10 illustrates an example of a typical computer system 900 that may be incorporated into the system 1000 according to an embodiment of the present invention. As noted previously, the computer system 900 may be incorporated into an imaging and analysis system 1000 or a user interface 100, or may be configured to receive image data from an image producing device 200 and to receive data from and send data to a user interface 100, for example, with user interaction via interface 910 of the system 900, such as in conjunction with user interface 100. Computer system 900 includes any number of processors 902 (also referred to as central processing units, or CPUs) that are coupled to storage devices including primary storage 906 (typically a random access memory, or RAM), primary storage 904 (typically a read only memory, or ROM). Primary storage 904 acts to transfer data and instructions uni-directionally to the CPU and primary storage 906 is used typically to transfer data and instructions in a bi-directional manner. Both of these primary storage devices may include any suitable computer-readable media such as those described above, wherein computer readable storage media do not refer to carrier waves. A mass storage device 908 is also coupled bi-directionally to CPU 902 and provides additional data storage capacity and may include any of the computer-readable media described above. Mass storage device 908 may be used to store programs, such as image processing algorithms, statistical analysis algorithms, programs for performing alpha-blending, table display, etc. and is typically a secondary storage medium such as a hard disk that is slower than primary storage. It will be appreciated that the information from primary storage 906, may, in appropriate cases, be stored on mass storage device 908 as virtual memory to free up space on primary storage 906, thereby increasing the effective memory of primary storage 906. A specific mass storage device such as a CD-ROM or DVD-ROM 914 may also pass data uni-directionally to the CPU 902.

CPU 902 is also coupled to an interface 910 that includes one or more input/output devices such as video monitors, user interface, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described methods. The above-described devices and materials are known in the computer hardware and software arts.

The hardware elements described above may operate in response to the instructions of multiple software modules for performing the operations of this invention. For example, instructions for calculating similar attributes profiles may be stored on mass storage device 908 or 914 and executed on CPU 908 in conjunction with primary memory 906.

While the present invention has been described with reference to the specific embodiments thereof, it should be understood that various changes may be made and equivalents may be substituted without departing from the true scope of the invention. In addition, many modifications may be made to adapt a particular situation, material, composition of matter, process, process step or steps, to the objective and scope of the present invention. All such modifications are intended to be within the scope of the claims appended hereto.

I claim:

1. A method of operating a computer system to provide a virtually stained image based on image-extracted measurements extracted from an image of at least one cell or sub-cellular component with said image, said method comprising:

causing said computer system to acquire an image comprising at least one of said cell or sub-cellular components; causing said computer system to determine at least one attribute from said image of said at least one of said cell or sub-cellular component; and causing said computer system to generate an image by virtually staining said image of said with at least one color, wherein different colors represent different attributes, and wherein said at least one color is virtually stained in locations of said image from where said image-extracted measurements were extracted for the attribute that said at least one color represents.

2. The method of claim 1, wherein each said color is mapped via color gradient mapping to a range of values.

3. The method of claim 2, wherein each said color is virtually stained in intensities that are representative of the attribute values at the locations that the colors are stained in.

4. The method of claim 1, comprising determining a boundary of said at least one cell or sub-cellular component, and displaying said boundary on said image.

5. The method of claim 1, wherein said image comprises a cell and said determining a boundary comprises determining a cell boundary of said at least one cell.

6. The method of claim 1, further comprising displaying at least one of a table of values of said at least one attribute and a statistical plot showing relationships of said at least one attribute adjacent the display of said virtually stained image.

7. The method of claim 6, wherein said virtually stained image and said at least one of a table of values and a statistical plot, are linked to provide interactive function on all displays by user selection on one of said displays.

8. The method of claim 7, wherein said image comprises cells, said method further comprising:
selecting, by a user, one of said cells in said image; and
in response to said selecting, automatically displaying attributes data for the selected cell in said table.

9. The method of claim 7, wherein said image comprises cells, said method further comprising:
selecting, by a user, one of said cells in said image or said table; and
selecting, by a user, a feature for finding all other cells in said image having similar attributes, wherein upon said selecting a feature, all other cells in said image having similar attributes to the selected cell are identified in at least one of said image and said table.

10. The method of claim 7, further comprising dynamically filtering the values in said table.

11. The method of claim 7, further comprising computationally analyzing the values in said table and displaying results of said computationally analyzing in said statistical plot.

12. The method of claim 7, further comprising:
adding user-created annotations to said table and displaying said user-created annotations.

13. The method of claim 12, further comprising performing at least one statistical calculation using said user-created annotations to classify the attribute values.

14. The method of claim 1, wherein said image is an image produced by an instrument in real time.

15. The method of claim 1, wherein said image comprises cells, said method further comprising:
selecting, by a user, one of said cells in said image; and
selecting, by a user, a feature for finding all other cells in said image having similar attributes, wherein upon said selecting a feature, all other cells in said image having similar attributes to the selected cell are identified.

16. The method of claim 1, further comprising adjusting the virtual staining of the image to emphasize one of: the stained attributes, and features of the image that existed prior to said virtual staining.

17. The method of claim 16, wherein said adjusting comprises varying the transparency/opacity of the virtual staining.

18. The method of claim 16, wherein said adjusting comprises flickering the display of the virtual staining by cyclically fading the display between a visualization of the virtual staining in fully transparent mode and fully opaque mode.

19. A user interface for displaying image-extracted measurements extracted from an image of at least one cell or sub-cellular component with said image, said user interface comprising:
a display;
a processor; and
programming executable by said processor for determining at least one attribute from said image-extracted measurement of at least one of said cell or sub-cellular component; and virtually staining the image of said at least one cell or sub-cellular component with at least one color, wherein different colors represent different attributes, and wherein said at least one color is virtually stained in locations of said image from where said image-extracted measurements were extracted for the attribute that that color represents.

20. The user interface of claim 19, further comprising a user selectable feature for each of said attributes displayed in a table, wherein selection of a feature for an attribute causes said user interface to virtually stain the image with virtual staining for the selected attribute.

21. The user interface of claim 19, further comprising a user-selectable adjustment feature for adjusting a transparency/opacity level of the virtual staining.

22. The user interface of claim 19, further comprising a user-selectable feature to initiate or end flickering the display of the virtual staining by cyclically fading the display between a visualization of the virtual staining in fully transparent mode and fully opaque mode.

23. A non-transitory computer readable storage medium having stored thereon one or more sequences of instructions for displaying representations of image-extracted measurements extracted from an image of at least one cell or sub-cellular component with said image, wherein execution of the one or more sequences of instructions by one or more processors causes the one or more processors to perform a process comprising:
determining at least one attribute from said image-extracted measurement of at least one of said cell or sub-cellular component; and
virtually staining the image of said at least one cell or sub-cellular component with at least one color, wherein different colors represent different attributes, and wherein said at least one color is virtually stained in locations of said image from where said image-extracted measurements were extracted for the attribute that that color represents.

24. The non-transitory computer readable storage medium of claim 23, further comprising one or more sequences of instructions for color mapping, wherein execution of the one or more sequences of instructions for color mapping by the one or more processors causes the one or more processors to color map each said color via color gradient mapping to a range of values determined for said respective attribute, and wherein each said color is virtually stained in colors that are representative of the attribute values at the locations that the colors are stained in.

25. The non-transitory computer readable storage medium of claim 23, further comprising one or more sequences of instructions for determining boundaries, wherein execution of the one or more sequences of instructions for determining boundaries by the one or more processors causes the one or more processors to determine boundaries of said at least one cell or sub-cellular component, and display said boundaries on said image.

26. The non-transitory computer readable storage medium of claim 23, further comprising one or more sequences of instructions for displaying, wherein execution of the one or more sequences of instructions for displaying by the one or more processors causes the one or more processors to display at least one of a table of values of said at least one attribute and a statistical plot showing relationships of said at least one attribute adjacent the display of said virtually stained image.

27. The non-transitory computer readable storage medium of claim 26, further comprising one or more sequences of instructions for linking, wherein execution of the one or more sequences of instructions for linking by the one or more processors causes the one or more processors to link said virtually displayed image and said at least one of a table of values and a statistical plot, to provide interactive function on all displays by user selection on one of said displays.

* * * * *

UNITED STATES PATENT AND TRADEMARK OFFICE
CERTIFICATE OF CORRECTION

| | | |
|---|---|---|
| PATENT NO. | : 8,340,389 B2 | Page 1 of 1 |
| APPLICATION NO. | : 12/324600 | |
| DATED | : December 25, 2012 | |
| INVENTOR(S) | : Robert H. Kincaid | |

It is certified that error appears in the above-identified patent and that said Letters Patent is hereby corrected as shown below:

On Cover page, item (56), under "OTHER PUBLICATIONS", in column 2, line 17, Delete "computin" and insert -- computing --, therefor.

On Cover page, item (57), under "ABSTRACT", in column 2, line 3, Delete "subcellular" and insert -- sub-cellular --, therefor.

On Cover page, item (57), under "ABSTRACT", in column 2, line 11, Delete "that that" and insert -- that --, therefor.

In column 17, line 4, in claim 1, delete "image of said" and insert -- image --, therefor.

In column 18, line 23, in claim 19, delete "that that" and insert -- that --, therefor.

In column 18, line 53, in claim 23, delete "that that" and insert -- that --, therefor.

Signed and Sealed this
Fifth Day of March, 2013

Teresa Stanek Rea
*Acting Director of the United States Patent and Trademark Office*